United States Patent
McDonald et al.

[11] Patent Number: 6,058,475
[45] Date of Patent: May 2, 2000

[54] BOOTING METHOD FOR MULTI-PROCESSOR COMPUTER

[75] Inventors: Edward A. McDonald, Baton Rouge, La.; Bobby W. Batchler, Columbia, S.C.

[73] Assignee: NCR Corporation, Dayton, Ohio

[21] Appl. No.: 08/935,910

[22] Filed: Sep. 22, 1997

[51] Int. Cl.[7] .......................... G06F 15/177; G06F 11/00
[52] U.S. Cl. .................................. 713/2; 714/36
[58] Field of Search ...................... 395/651, 652, 395/653, 200.5, 200.51, 200.52, 712; 713/1, 2, 3, 100; 709/220, 221, 222; 714/36

[56] References Cited

U.S. PATENT DOCUMENTS

| | | | |
|---|---|---|---|
| 4,679,166 | 7/1987 | Berger et al. ........................ | 364/900 |
| 5,327,548 | 7/1994 | Hardell, Jr. et al. ................. | 395/425 |
| 5,448,716 | 9/1995 | Hardell, Jr. et al. ................. | 395/550 |
| 5,450,576 | 9/1995 | Kennedy .............................. | 395/650 |
| 5,491,788 | 2/1996 | Cepulis et al. ...................... | 395/182.11 |
| 5,495,569 | 2/1996 | Kotzur ................................. | 395/181 |
| 5,659,748 | 8/1997 | Kennedy .............................. | 395/652 |
| 5,724,527 | 3/1998 | Karnik et al. ....................... | 713/2 |
| 5,860,002 | 1/1999 | Huang ................................. | 713/2 |

*Primary Examiner*—Joseph E. Palys
*Assistant Examiner*—Omar A. Omar
*Attorney, Agent, or Firm*—Gregory A. Welte

[57] ABSTRACT

A system for booting a multi-processor computer. If a normal boot attempt fails, different processors are selected, one-at-a-time, for performing the boot routine. During the boot routing, all other processors are held inactive. After boot, processors are tested for health. Non-healthy processors are held inactive, and healthy processors are activated as usual.

3 Claims, 3 Drawing Sheets

BOOTING METHOD FOR MULTI-PROCESSOR COMPUTER

This invention concerns a booting, or initialization, process in multi-processor computers which successfully accomplishes booting, despite possible malfunctions in one, or more, processors.

BACKGROUND OF THE INVENTION

Many single-processor computers undergo a "boot" routine during start-up. The boot routine is controlled by a computer program, and performs such tasks as (1) loading an operating system, (2) checking memory for defects, (3) loading software drivers needed for equipment associated with the computer, and other tasks.

If the processor in the computer is defective, that fact will soon become apparent, because the boot process will fail, since that processor is required to run the boot program. However, in multi-processor computers, a faulty processor will not appear so readily, and, in addition, the presence of faulty processors can create complications.

For example, in a multi-processor computer, the processor assigned to handle booting may be fully operative, yet another processor may be defective. But, unlike the single-processor case, a successfully boot does not indicate operability of all processors within the system.

Further, at least two failure modes are possible in the defective processor. In one mode, the failed processor becomes completely dead: it simply behaves as an open circuit to all its inputs and outputs. In this mode, the processor behaves as if nonexistent, and is not necessarily a danger to the operation of the computer. In the other mode, the processor may act as a short circuit, or, worse, it may actively undertake unwanted processing steps, thereby interfering with the operation of other processors in the computer.

As another example, some computers are equipped with multiple processors of the same type. If the booting routine is assigned to a specific processor exclusively, such as processor number 1 for every boot-up, then a paradox can arise. If processor number 1 fails to complete boot-up, the computer becomes non-usable, despite the fact that other, similar, processors are available, which could handle the boot routine.

These examples illustrate a need for detecting failed processors in multi-processor computers.

OBJECTS OF THE INVENTION

An object of the invention is to provide an improved booting system in multi-processor computers.

SUMMARY OF THE INVENTION

In one form of the invention, all processors are tested, in advance, prior to booting, by a logic module. Defective processors are de-activated, and one of the operative processors, if any, is selected to handle the boot routine.

DETAILED DESCRIPTION OF THE INVENTION

Figure 1:
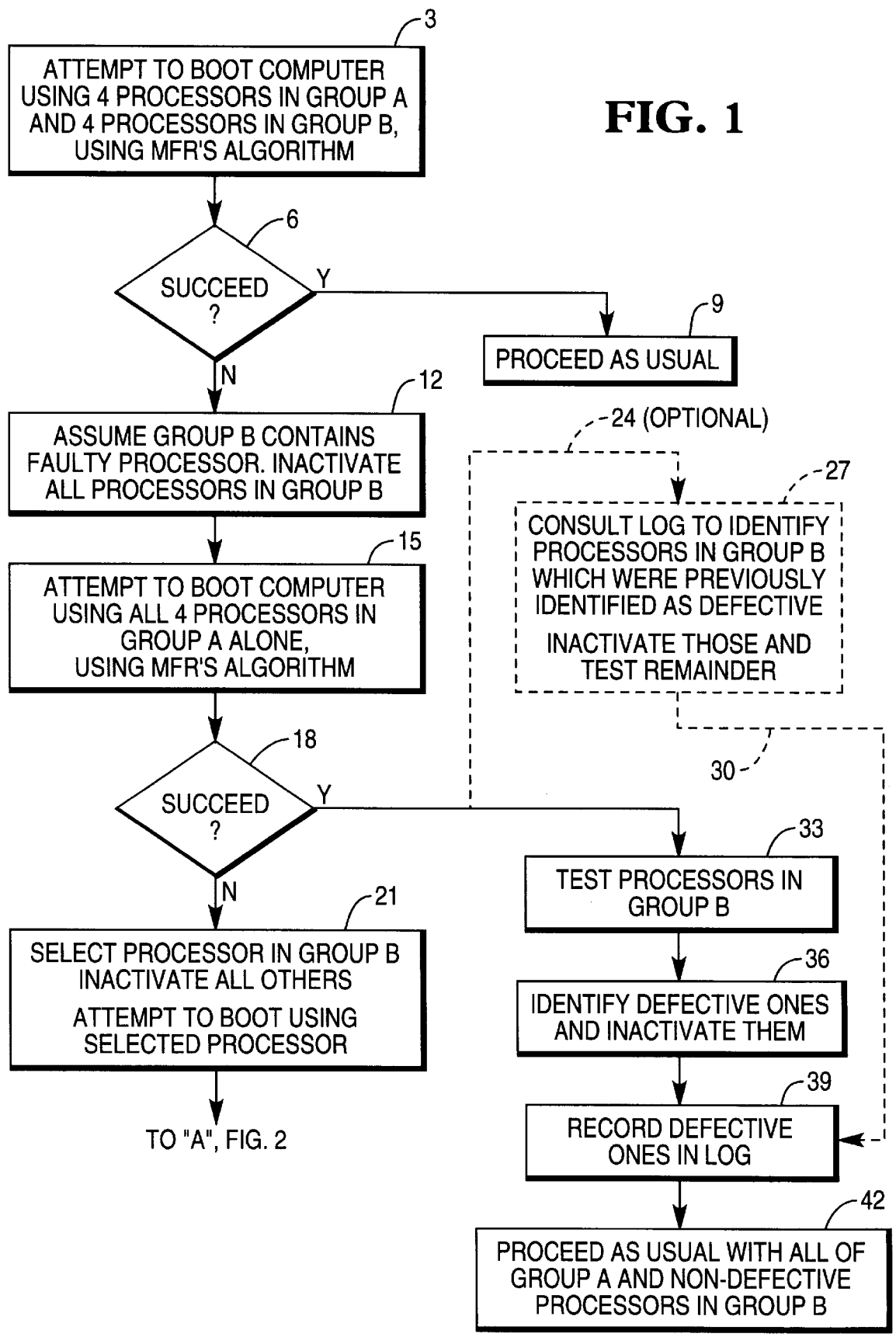
FIGS. 1 and 2 are a flow chart which illustrates logic implemented by form of the invention.
Figure 2:
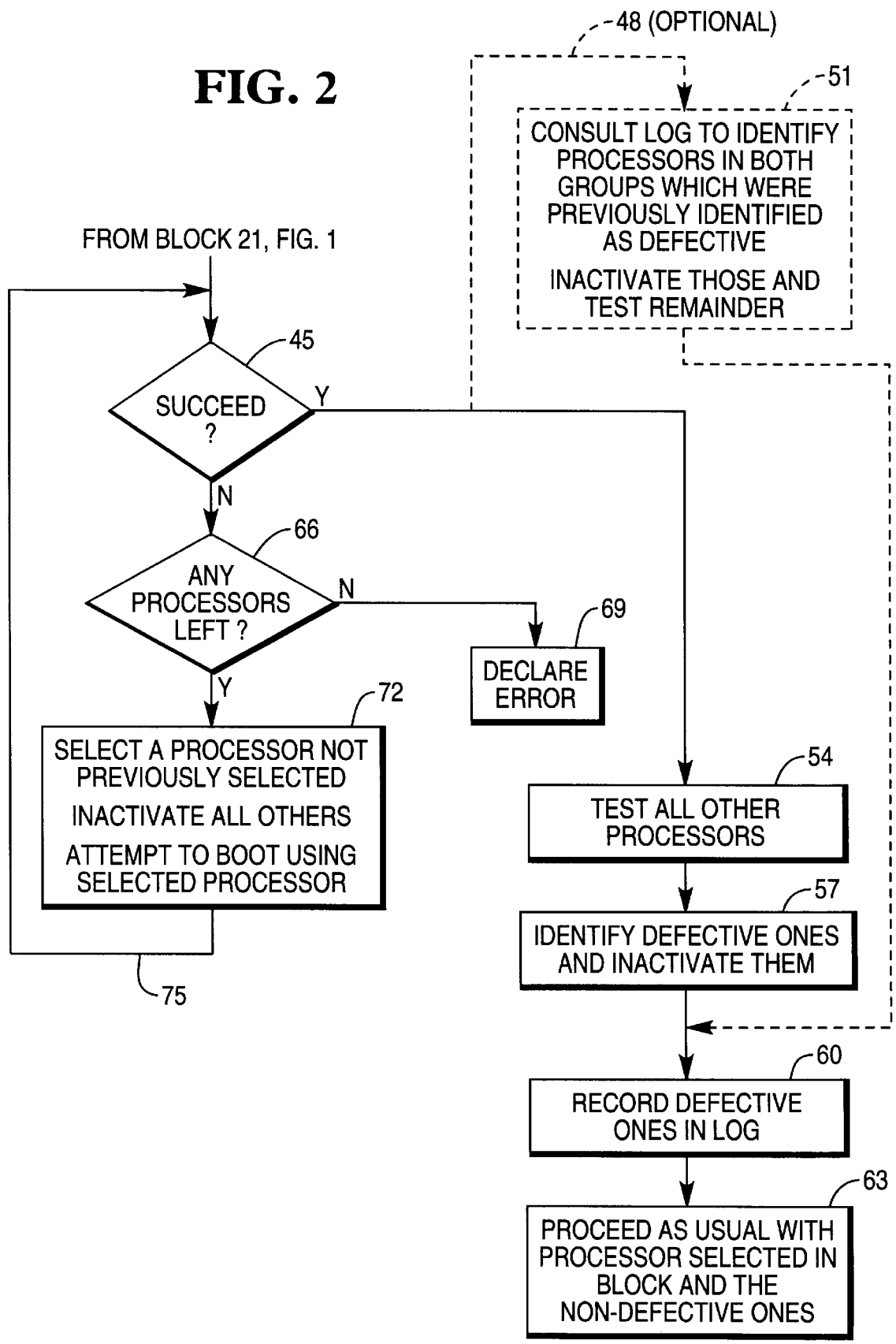

FIGS. 1 and 2 illustrate logic undertaken by the invention in booting a computer which contains eight processors. The eight processors are divided into two groups, such as group A, containing processors 1, 2, 3, and 4, and group B, containing processors 5, 6, 7, and 8. Block 3 in FIG. 1 indicates that all eight processors are involved in the initial boot routine. This initial boot routine was not developed by the Inventors, but is supplied by the manufacturer of the processors.

One example of such a routine is that available from INTEL Corporation, Santa Clara, Calif., for its Pentium Pro multiprocessor bus. If this INTEL routine is used, then groups A and B will generally contain INTEL Pentium Pro processors.

Block 6 inquires whether the initial routine succeeds. If so, block 9 is reached, which indicates that operation of the computer proceeds as usual. The boot-up was successful.

If the boot-up was not successful, block 12 is reached. Block 12 inactivates all processors in group B. This inactivation is done because (1) it is expected that the failure in boot-up is attributable to a defective processor handling the boot and (2) it is expected that group B contains this processor.

Regarding the latter expectation, it is believed that the manufacturer's routine, referenced in block 3, assigns a specific processor to handle the boot routine in every case, and that this processor is the highest-numbered processor in the groups used. For example, if groups A and B are used, then that processor is processor number 8. If group A alone is used, then that processor is processor number 4. Thus, inactivation of group B inactivates the processor believed to have been responsible for the faulty boot routine attempted using both groups A and B.

Returning to FIG. 1, after inactivation of group B, the logic reaches block 15, which attempts to boot the computer using all four processors of the other group, namely, group A. Again, the manufacturer's boot routine is used.

Block 18 inquires whether the attempted boot succeeds. If so, the YES branch is taken. The OPTIONAL branch 24 will be discussed shortly. The YES branch leads to block 33, wherein all processors in group B, the de-activated group, are tested for operability. The testing is controlled by either the successful boot processor, or a processor in group A designated by it.

The test on each processor cannot be exhaustive, because the modern microprocessor is so complex that it can enter an astronomical number of logic states. Every state cannot be tested, because the time required would be excessive. Instead, a simpler test is used, and numerous such tests are known in the art. As a simple example, the processor can be given a small program to run, at the end of which the processor sets a flag in a register. When the flag is detected, the processor is assumed to be operating correctly.

When a defective processor is found, it is inactivated, as indicated by block 36, and block 39 records the identity of the defective processors in a log. Then, as block 42 indicates, operation proceeds as usual, but with defective processors identified and inactivated.

The OPTIONAL path 24 will now be discussed. It may be desirable to eliminate the present testing step for processors which have been identified as defective in a previous test. One reason is that, in general, once a processor has been found to be defective, the processor will remain defective indefinitely. In the OPTIONAL path 24, block 27 examines the log mentioned in block 39, for processors previously identified as defective. Those defective processors are inactivated, and the remainder will be tested. Then, block 39 is reached, by path 30.

Sometimes, the log may be empty, as in a new computer which has never been booted. The examination undertaken by block 27 will find no defective processors identified in the log. But the empty log creates no problem. Block 27 tests the processors not listed in the log. Thus, if the log contains no defective processors, then all other processors, in group B, are tested. No processors in group B escape testing, even if the log is empty.

Partial Recapitulation

Therefore, in partial recapitulation, the logic of FIG. 1 operates as follows:

1. The manufacturer's boot routine is attempted using groups A and B. If the boot succeeds, operation commences as usual.

2. If the boot fails, it is assumed that the booting processor is defective, and is contained in group B. Group B is inactivated, and the manufacturer's boot routine is then attempted on group A alone. If that boot succeeds, then the processors in group B are tested. Faulty processors are identified, logged, and inactivated. Normal operation then proceeds with the four processors in group A, together with the non-defective processors identified in group B, and the defective processors in group B inactivated.

At this point, the appearance of a possible problem will be addressed. If block 9 is reached, none of the processors in groups A and B will be tested by block 33. It may be thought that further operation is at-risk, because group A or B may contain defective processors, which will not be identified by the test.

Similarly, if the YES branch of block 18 is taken, none of the processors in group A will be tested by block 33. It may also be thought that further operation is at-risk, because the processors in group A are not tested by block 33. However, neither of these risk situations occur.

The reason is that the manufacturer's algorithms, referenced in blocks 3 and 15, perform their own testing. Thus, if block 9 is reached, then all processors in groups A and B are assumed to be functional. Similarly, if block 27 is reached, all processors in group A are assumed to be functional. Restated, the testing of block 33 is not the sole procedure used to evaluate the health of the eight processors.

Returning to FIG. 1: in block 18, it was assumed that the attempted boot succeeded using group A alone, and that the YES branch was taken. However, if that boot fails, then block 21 is reached, which selects a processor in group B, attempts to boot using that processor, and inactivates all other processors, in both groups A and B.

These steps are motivated by the assumptions that (1) a processor in group B has failed because the NO path was taken from block 6, and (2) a processor in group A has failed, because of the NO path taken from block 18. That is, one processor in each group is assumed defective. A search is now made for an operative processor.

In block 21, a processor is selected from group B. This decision is somewhat arbitrary, since the processor could be selected from group A, but group B is selected, because group A was last selected. The logic proceeds to FIG. 2.

Block 45 inquires whether the attempted boot succeeds. If so, the YES branch is taken. As before, the OPTIONAL path 48 could be taken. That path leads to block 51, which consults the logs, to identify processors previously identified as defective. Those processors are inactivated, and the remainder are tested. Then the logic reaches block 60.

If block 51 is not used, the logic from block 45 reaches block 54, which tests all other processors, apart from the successful boot processor, which is performing the testing. The processors found defective are inactivated, in block 57, and their identities are recorded in the log, in block 60. Then operation then proceeds as usual, in block 63.

If, in block 45, the NO path was taken, block 66 inquires whether any processors remain, which have not been used in a boot attempt. If not, an error is declared, in block 69, because all processors have been found to be defective.

If one or more processors remain, block 72 selects one of them, inactivates the others, and attempts a boot. The logic returns to block 45, where the operation described above repeats from that block onward.

In selecting the processors, one-by-one, for attempting a boot, one selection sequence is the following:

TABLE 1

| Selection Sequence | |
|---|---|
| GROUP | PROCESSOR |
| B | 2 (6) |
| B | 3 (7) |
| B | 1 (5) |
| B | 4 (8) |
| A | 2 |
| A | 3 |
| A | 1 |
| A | 4 |

The parenthetical numbers refer to numbering beginning from number 1, when groups A and B are used together. The non-parenthetical numbering refers to numbers within each group individually.

Partial Recapitulation

Therefore, in continuing the partial recapitulation given above, the logic beginning with block 21 of FIG. 1 operates as follows:

3. Individual processors are selected, one-at-a-time, and a boot is attempted using each. As indicated in Table 1, four processors are selected from group B, then four from group A. Also, within each group, the highest-numbered processor is selected last, because it is expected that this processor was the boot processor, and responsible for the original failure of the group to boot. All other processors are held inactive during the boot attempt.

4. After a successful boot, the remaining processors are tested. Testing is done by the successful booting processor. Defective processors are inactivated, and logged.

5. The non-defective processors are used, together with the successful boot processor, in normal operation of the system. Defective processors are held inactive.

Alternate Embodiment

In the preceding discussion, a boot was first attempted. Then, if the boot succeeded, the booting processor was used to test other processors.

Figure 3:
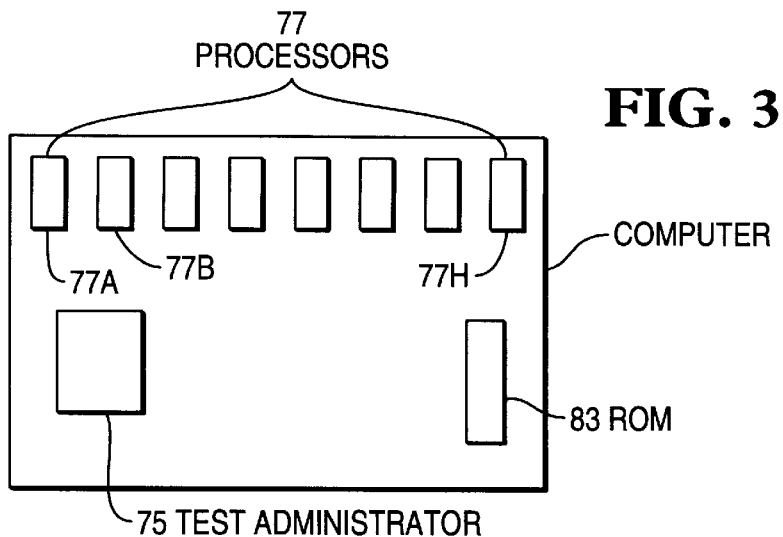
FIG. 3 illustrates one form of the invention.

In another embodiment, the processors are tested, prior to booting. FIG. 3 contains a logic module, labeled a test administrator 75. The test administrator 75 tests the processors 77, prior to any significant boot activity, to ascertain which are operative, and which are defective. Then, one of the operative processors is chosen as a boot processor, and normal boot-up occurs, with all other processors held inactive. After boot-up succeeds, the operative processors are activated.

Figure 4:
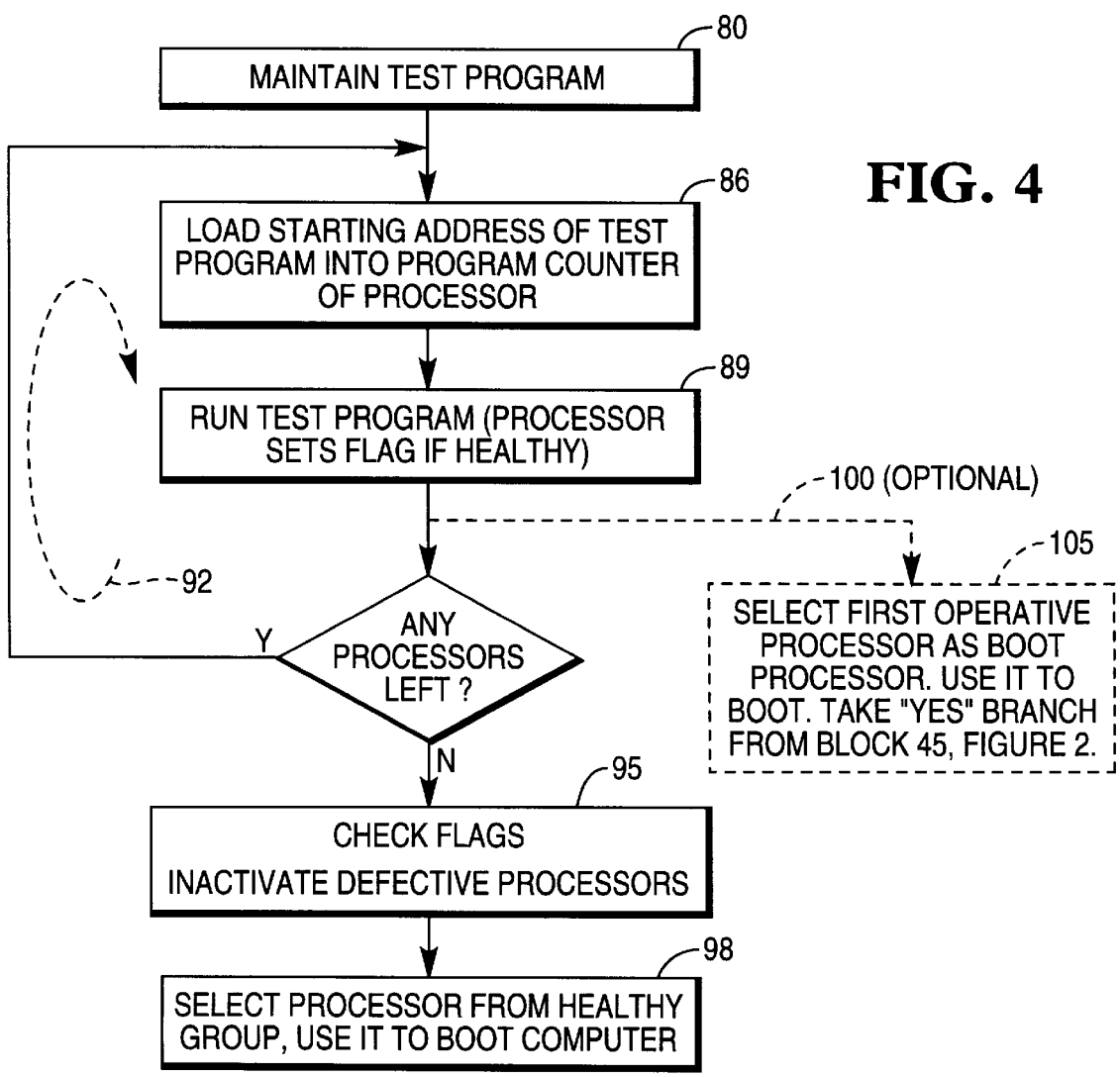
FIG. 4 is a flow chart which illustrates logic implemented by another form of the invention.

FIG. 4 is a flow chart of logic which the test administrator 75 may follow. Block 80 indicates that a test routine is stored in at some location in memory. This test routine can be permanently burned into Read Only Memory, ROM, as indicated by memory 83 in FIG. 3, or this test routine can be retrieved from mass storage, when needed, by the administrator 75. In either case, block 86 in FIG. 4 indicates that the logic module 75 causes the first processor 77A to be tested to run the test routine, as by loading the program counter of that processor with the starting address of the test routine.

The first processor runs the test routine and sets a flag in a register if the test is successful, as indicated by block 89. Then, because of loop 92, the administrator 75 causes the second processor 77B to run the test routine, and so on, until all processors have run the test routine. Then the administrator 75 examines the flags, as indicated by block 95. As indicated in block 98, defective processors, which did not set flags, are inactivated, and held inactivated. Of the non-defective processors, a boot processor is selected, and is then used to execute the boot-up routine. The defective processors may be logged, as discussed above.

Additional Considerations

1. The invention operates under a possible inconsistency in logic, yet gives good results, despite that fact. An example of the inconsistency is this: If block 3 in FIG. 1 fails to produce a boot, group B is assumed to contain a defective processor. Consequently, group B is de-activated, and a boot is attempted using group A, alone.

Later, if group A fails to produce a boot, then a boot is attempted using the processors individually, including the processor presumed defective in Group B (if the logic gets that far). A similar comment applies to the attempted boot using group A in block 15 of FIG. 1.

Restated in different words: if block 15 fails to produce a boot, then the assumed booting processor of group B, number 8, which was also presumed defective, is given another "chance," in the fourth attempt in Table 1, if the logic gets that far. Similarly, the assumed booting processor of group A, number 4, which was presumed defective, is given another "chance," as the eighth attempt in Table 1, if the logic gets that far.

2. The test administrator 75 in FIG. 3 is not a processor, and is not used in normal operation of the computer, except for initial testing of processors. It thus operates differently from a booted processor which runs test routines on other processors. Such a booted processor continues operation, after boot-up, but the test administrator 75 does not.

Of course, the test administrator 75 can include a processor, or can contain hard-wired logic. Its primary function is to execute the logic of FIG. 4, which tests the processors, irrespective of how it is constructed.

Since the test administrator 75 performs a simple function, compared to the microprocessors 77, it will contain simple logic. Being simple, it can be considered almost completely reliable. That is, two reasons for failure in microprocessors are (1) the extremely small size of their transistors and (2) the complexity of their circuitry. However, simpler logic, or simpler microprocessors, do not require such small transistors, nor such complex circuitry, and can be manufactured to a higher standard of reliability.

As a specific example, the microprocessors 77 in FIG. 3 may be manufactured using a given gate, or channel, length, such as 1.0 micron, or smaller. The test administrator 75 can be manufactured using a simpler, or more primitive, technology, such as 2.0 micron technology, or higher.

In the fabrication of integrated circuits, the gate length, or channel length, of the field-effect transistors is commonly called the "technology" used. For example, "two-micron" technology refers to a specific channel length. The technology of the administrator 75 can be 2, 3, 4, 5, or any multiple, of that used by the microprocessors 77.

Thus, under one form of the invention, the "technology" used for the test administrator 75 is fundamentally different from that of the microprocessors 77 in FIG. 3. In another form of the invention, the "technology" can be the same, but the test administrator 75 is constructed using a different, simpler, architecture than the primary microprocessors 77. As a specific example, the administrator 75 may be a simple processor, such as a model 6502, Z80, etc., and the primary processors 77 may be the Pentium Pro's discussed above.

3. The overall operation of the test administrator 75 can be a hybrid between (1) FIG. 4 and (2) FIGS. 1 and 2. For example, the test administrator 75 in FIG. 3 can begin testing the processors. As soon as an operative processor is found, path 100 in FIG. 4 is taken. As indicated in block 105, that processor can be assigned as the boot processor, and execute the boot routine. In addition, the logic jumps to the YES branch of block 45 in FIG. 2. That booting processor, after completing the boot routine, tests the other processors, and performs the other steps indicated in blocks 57, 60, and 63, or block 51, if used.

4. If the test administrator 75 is used, and if all processors are tested prior to boot-up, then, during boot-up, it may not be necessary to inactivate all processors other than the boot processor, as in block 21 of FIG. 1. Only the defective processors are inactivated, and the operative processors may be allowed to run. Alternately, all processors can be inactivated, except the booting processor.

5. The discussion above referred to detecting a successful boot-up. Such detection is known in the art. For example, some processors set a flag on one of their pins, or at another location, upon successful boot-up.

6. The invention preferably applies to systems having three, or more, processors.

Numerous substitutions and modifications can be undertaken without departing from the true spirit and scope of the invention. What is desired to be secured by Letters Patent is the invention as defined in the following claims.

What is claimed is:

1. For a computer which contains multiple processors, wherein all processors run properly after a normal boot, the improvement comprising the following sequence of steps:
   a) after a faulty boot, de-activating a first subset of the processors, and attempting a boot using a second subset of two or more processors all of which are actively involved in the boot process;
   b) if step (a) fails to produce a boot, repeatedly performing the following until a boot occurs:
      i) selecting one processor,
      ii) inactivating all other processors, and
      iii) attempting a boot using the selected processor.

2. For a computer which contains multiple processors, grouped into groups A and B, wherein all processors ordinarily run properly after a boot, the improvement comprising the following steps:
   a) after a faulty boot, de-activating group B and attempting a boot using group A; then
      i) if group A produces a boot,
         A) testing all processors in group B,
         B) de-activating all processors in group B which are found defective; and C) storing, in a log, the identities of all processors found defective; then
ii) if group A fails to produce a boot, repeatedly performing the following until a boot occurs:
A) selecting a processor;
B) de-activating all other processors;
C) attempting a boot with the selected processor;
iii) after a boot occurs,
A) testing all processors other than the booting processor,
B) de-activating all processors which are found defective; and
C) storing, in a log, the identities of all processors found defective.

3. A method of booting a computer containing more than two processors, comprising the following steps:
a) attempting a boot while allowing a sub-set of the processors to remain active, said sub-set containing more than one processor;
b) if the attempted boot fails,
i) selecting a processor for booting,
ii) holding all other processors inactive,
iii) attempting a boot using the selected processor; and
c) repeating step (b) until either
i) a successful boot occurs, or
ii) all processors have been selected.

* * * * *